(12) United States Patent
Kim et al.

(10) Patent No.: US 12,060,123 B2
(45) Date of Patent: Aug. 13, 2024

(54) ROBOT

(71) Applicant: LG ELECTRONICS INC., Seoul (KR)

(72) Inventors: Baekchul Kim, Seoul (KR); Yongjun Kim, Seoul (KR); Namjin Kim, Seoul (KR); Woong Jeong, Seoul (KR); Mingon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 389 days.

(21) Appl. No.: 17/486,757

(22) Filed: Sep. 27, 2021

(65) Prior Publication Data

US 2022/0097785 A1   Mar. 31, 2022

(30) Foreign Application Priority Data

Sep. 29, 2020  (KR) .................. 10-2020-0127144
Sep. 9, 2021   (KR) .................. 10-2021-0120267

(51) Int. Cl.
| B62D 57/02 | (2006.01) |
| B62D 57/024 | (2006.01) |
| B62D 57/028 | (2006.01) |
| B62D 61/12 | (2006.01) |

(52) U.S. Cl.
CPC ......... B62D 57/022 (2013.01); B62D 57/024 (2013.01); B62D 57/028 (2013.01); B62D 61/12 (2013.01)

(58) Field of Classification Search
CPC ..... B62D 57/022; B62D 57/028; B62D 61/12
See application file for complete search history.

(56) References Cited

U.S. PATENT DOCUMENTS

2019/0133400 A1*  5/2019  Klintemyr ........... A47L 11/4072
2022/0097785 A1*  3/2022  Kim ....................... B25J 13/085

FOREIGN PATENT DOCUMENTS

| JP | 2005028971 | 2/2005 |
| JP | 2006190105 | 7/2006 |
| JP | 2009107468 | 5/2009 |
| JP | 2014234137 | 12/2014 |
| KR | 20120127956 | 11/2012 |
| KR | 1020170083854 | 7/2017 |

OTHER PUBLICATIONS

Machine Translation of JP 2005-28971, Feb. 3, 2005 (Year: 2005).*
PCT International Application No. PCT/KR2021/011662, International Search Report dated Nov. 24, 2021, 9 pages.

* cited by examiner

*Primary Examiner* — Kevin Hurley
(74) *Attorney, Agent, or Firm* — LEE, HONG, DEGERMAN, KANG & WAIMEY

(57) ABSTRACT

According to an embodiment, a robot includes a supporter disposed in the lower portion of a body to be spaced apart from a rear joint and a front joint and having a length shorter than a length of the rear joint and a length of the front joint; and a processor configured to perform a rear joint raising mode when a moved distance of the body is within a set distance or the body is stationary during driving of a front drive motor, and the rear joint raising mode is a mode in which a rear joint motor raises the rear joint such that a rear wheel which is connected to the rear joint is spaced apart from the ground.

7 Claims, 17 Drawing Sheets

(a)

(b)

(a)

(b)

ROBOT

CROSS-REFERENCE TO RELATED APPLICATIONS

Pursuant to 35 U.S.C. § 119(a), this application claims the benefit of earlier filing date and right of priority to Korean Patent Application Nos. 10-2020-0127144, filed on Sep. 29, 2020, and 10-2021-0120267, filed on Sep. 9, 2021, the contents of which are hereby incorporated by reference herein in its entirety.

BACKGROUND OF THE INVENTION

1. Field of the Invention

The present disclosure relates to a robot and a control method thereof, and more particularly, to a robot having a front wheel and a rear wheel, and a control method thereof.

2. Discussion of the Related Art

A robot is a machine that automatically handles or operates a given task by its own ability. The robot's application field is generally classified into various fields such as industrial, medical, space, submarine, and the like, and can be used in various fields.

A robot may pass through high obstacles or terrain with steps, and an example of such a robot is disclosed in Korean Patent Application No. 10-2017-0083854 A (published on Jul. 19, 2017) which discloses a mobile robot equipped with variable wheels in which the mobile robot equipped with variable wheels maintains a circular wheel shape on flat ground, and when the robot encounters obstacles such as stairs, changes the shape of the wheel by adjusting the lengths of spokes formed on the wheel to travel.

The wheel unit of the mobile robot may include a rotation shaft that is rotated by receiving drive force from a drive motor, a wheel hub formed at the front end of the rotation shaft, and a plurality of spokes radially positioned on the outer peripheral surface of the wheel to be spaced apart from one another and a grounding portion respectively formed at the front ends of the spokes and grounded to the road surface.

SUMMARY OF THE INVENTION

An object of the present disclosure is to provide a robot capable of passing through terrain having a step with a simple structure.

An object of the present disclosure is to provide a method for controlling a robot that can pass through a terrain having a step with a simple control.

According to an embodiment, a robot includes a rear joint motor and a front joint motor installed to be spaced apart from each other in a lower portion of a body; a rear joint configured to be rotated by the rear joint motor; a rear drive motor disposed in a lower portion of the rear joint; a rear wheel configured to be rotated by the rear drive motor; a front joint configured to be rotated by the front joint motor; a front drive motor disposed in a lower portion of the front joint; a front wheel configured to be rotated by the front drive motor; a supporter disposed in the lower portion of the body to be spaced apart from the rear joint and the front joint and having a length shorter than a length of the rear joint and a length of the front joint; and a processor configured to execute a rear joint raising mode when a moved distance of the body is within a set distance or the body is stationary during driving of the front drive motor.

The rear joint raising mode may be a mode in which the rear joint motor raises the rear joint such that the rear wheel is spaced apart from the ground.

The supporter is closer to the rear drive motor than the front drive motor.

The supporter may be disposed to protrude downward from a bottom surface of the body.

An example of the supporter may be a caster disposed on the bottom surface of the body.

Another example of the supporter may be an elastic member disposed on the bottom surface of the body. The supporter may be convex towards the ground.

The robot may further include an encoder disposed on the front drive motor, and an inertial sensor and a vision sensor installed on the body.

The processor may start a rear joint raising mode according to sensing results of the encoder, the inertial sensor, and the vision sensor.

The processor may drive the front drive motor after the rear joint rising mode, and when the body is moved a set distance, perform a rear joint lowering mode, and control the rear joint motor in the rear joint lowering mode such that the supporter is spaced apart from the ground.

According to an embodiment, a method for controlling a robot, the robot including a rear joint motor and a front joint motor installed to be spaced apart from each other in a lower portion of a body, a rear joint configured to be rotated by the rear joint motor, a rear drive motor disposed in a lower portion of the rear joint, a rear wheel configured to be rotated by the rear drive motor, a front joint configured to be rotated by the front joint motor, a front drive motor disposed in a lower portion of the front joint, a front wheel configured to be rotated by the front drive motor, and a supporter disposed in the lower portion of the body to be spaced apart from the rear joint and the front joint, the method includes driving the front drive motor and the rear drive motor and controlling the rear joint motor in a rear joint raising mode such that the supporter is in contact with the ground when the body is stopped during driving of the front drive motor.

The method may further include controlling the rear joint motor in the rear joint lowering mode when the front drive motor is driven and the body is moved a set distance after the rear joint rising mode.

According to the present embodiment, even when the robot meets a stepped terrain, the rear wheel may be separated from the ground and the load may be distributed by the supporter, so that the robot may easily climb on the stepped terrain and the driving ability of the robot this may be improved.

In addition, with the simple control of rotating the rear joint, the robot may easily pass through the stepped terrain without avoiding the stepped terrain.

In addition, the supporter may function as an auxiliary wheel to help the robot travel smoothly when the robot passes through the stepped terrain.

In addition, since the supporter is made of an elastic member, it is possible to minimize the impact that may occur when the robot climbs on the stepped terrain.

DETAILED DESCRIPTION OF THE PREFERRED EMBODIMENTS

Figure 1:
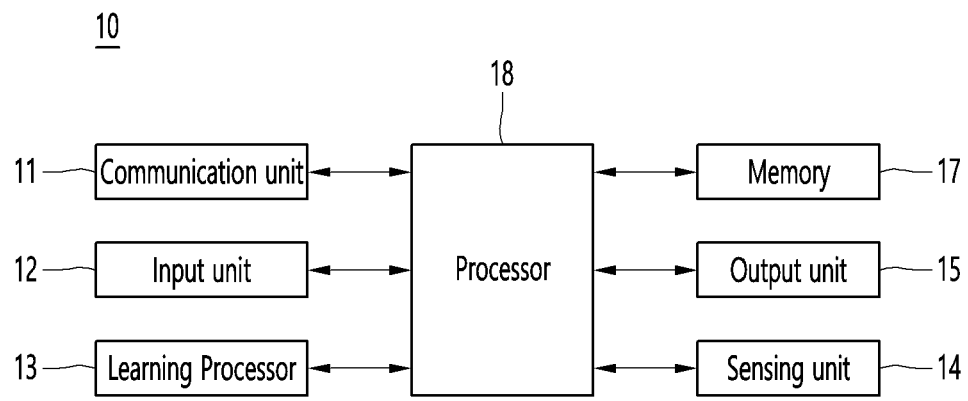
FIG. 1 illustrates an AI device including a robot according to an embodiment.

Hereinafter, detailed embodiments will be described in detail with reference to the accompanying drawings.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

FIG. 1 illustrates an AI device 10 including a robot according to an embodiment of the present disclosure.

The AI device 10 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 10 may include a communicator 11, an input interface 12, a learning processor 13, a sensor 14, an output interface 15, a memory 17, and a processor 18.

The communicator 11 may transmit and receive data to and from external devices such as other AI devices 10a to 10e and the AI server 20 by using wire/wireless communication technology. For example, the communicator 11 may transmit and receive sensor information, a user input, a learning model, and a control signal to and from external devices.

The communication technology used by the communicator 11 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input interface 12 may acquire various kinds of data.

At this time, the input interface 12 may include a camera for inputting a video signal, a microphone for receiving an audio signal, and a user input interface for receiving information from a user. The camera or the microphone may be treated as a sensor, and the signal acquired from the camera or the microphone may be referred to as sensing data or sensor information.

The input interface 12 may acquire a learning data for model learning and an input data to be used when an output is acquired by using learning model. The input interface 12 may acquire raw input data. In this case, the processor 18 or the learning processor 13 may extract an input feature by preprocessing the input data.

The learning processor 13 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 13 may perform AI processing together with the learning processor 24 of the AI server 20.

At this time, the learning processor 13 may include a memory integrated or implemented in the AI device 10. Alternatively, the learning processor 13 may be implemented by using the memory 17, an external memory directly connected to the AI device 10, or a memory held in an external device.

The sensor 14 may acquire at least one of internal information about the AI device 10, ambient environment information about the AI device 10, and user information by using various sensors.

Examples of the sensors included in the sensor 14 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output interface 15 may generate an output related to a visual sense, an auditory sense, or a haptic sense.

At this time, the output interface 15 may include a display unit for outputting time information, a speaker for outputting auditory information, and a haptic module for outputting haptic information.

The memory 17 may store data that supports various functions of the AI device 10. For example, the memory 17 may store input data acquired by the input interface 12, learning data, a learning model, a learning history, and the like.

The processor 18 may determine at least one executable operation of the AI device 10 based on information determined or generated by using a data analysis algorithm or a machine learning algorithm. The processor 18 may control the components of the AI device 10 to execute the determined operation.

To this end, the processor 18 may request, search, receive, or utilize data of the learning processor 13 or the memory 17. The processor 18 may control the components of the AI device 10 to execute the predicted operation or the operation determined to be desirable among the at least one executable operation.

When the connection of an external device is required to perform the determined operation, the processor 18 may generate a control signal for controlling the external device and may transmit the generated control signal to the external device. The processor 18 may acquire intention information for the user input and may determine the user's requirements based on the acquired intention information.

The processor 18 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 13, may be learned by the learning processor 24 of the AI server 20, or may be learned by their distributed processing.

The processor 18 may collect history information including the operation contents of the AI apparatus 10 or the user's feedback on the operation and may store the collected history information in the memory 17 or the learning processor 13 or transmit the collected history information to the external device such as the AI server 20. The collected history information may be used to update the learning model.

The processor 18 may control at least part of the components of AI device 10 so as to drive an application program stored in memory 17. Furthermore, the processor 18 may operate two or more of the components included in the AI device 10 in combination so as to drive the application program.

Figure 2:
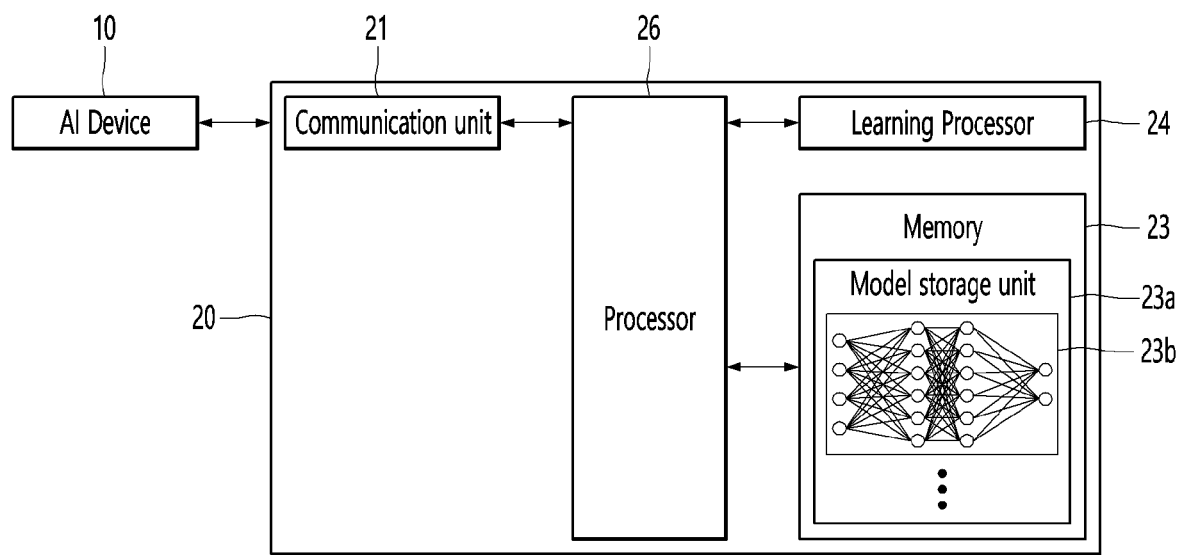
FIG. 2 illustrates an AI server connected to a robot according to an embodiment.

FIG. 2 illustrates an AI server connected to a robot according to an embodiment of the present disclosure.

Referring to FIG. 2, the AI server 20 may refer to a device that learns an artificial neural network by using a machine learning algorithm or uses a learned artificial neural network. The AI server 20 may include a plurality of servers to perform distributed processing, or may be defined as a 5G network. At this time, the AI server 20 may be included as a partial configuration of the AI device 10, and may perform at least part of the AI processing together.

The AI server 20 may include a communicator 21, a memory 23, a learning processor 24, a processor 26, and the like.

The communicator 21 can transmit and receive data to and from an external device such as the AI device 10.

The memory 23 may include a model storage unit 23a. The model storage unit 23a may store a learning or learned model (or an artificial neural network 26b) through the learning processor 24.

The learning processor 24 may learn the artificial neural network 26b by using the learning data. The learning model may be used in a state of being mounted on the AI server 20 of the artificial neural network, or may be used in a state of being mounted on an external device such as the AI device 10.

The learning model may be implemented in hardware, software, or a combination of hardware and software. If all or part of the learning models are implemented in software, one or more instructions that constitute the learning model may be stored in memory 23.

The processor 26 may infer the result value for new input data by using the learning model and may generate a response or a control command based on the inferred result value.

Figure 3:
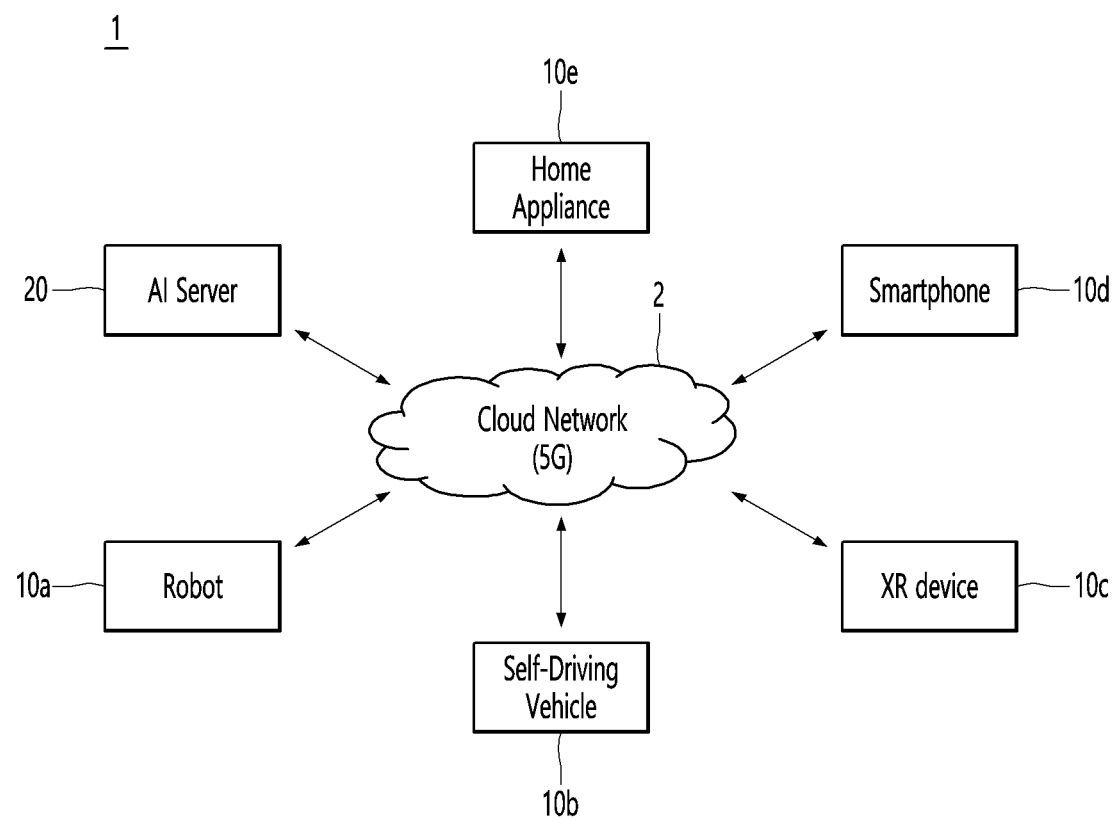
FIG. 3 illustrates an AI system according to an embodiment.

FIG. 3 illustrates an AI system 1 according to an embodiment of the present disclosure.

Referring to FIG. 3, in the AI system 1, at least one of an AI server 20, a robot 10a, a self-driving vehicle 10b, an XR device 10c, a smartphone 10d, or a home appliance 10e is connected to a cloud network 2. The robot 10a, the self-driving vehicle 10b, the XR device 10c, the smartphone 10d, or the home appliance 10e, to which the AI technology is applied, may be referred to as AI devices 10a to 10e.

The cloud network 2 may refer to a network that forms part of a cloud computing infrastructure or exists in a cloud computing infrastructure. The cloud network 2 may be configured by using a 3G network, a 4G or LTE network, or a 5G network.

That is, the devices 10a to 10e and 20 configuring the AI system 1 may be connected to each other through the cloud network 2. In particular, each of the devices 10a to 10e and 20 may communicate with each other through a base station, but may directly communicate with each other without using a base station.

The AI server 20 may include a server that performs AI processing and a server that performs operations on big data.

The AI server 20 may be connected to at least one of the AI devices constituting the AI system 1, that is, the robot 10a, the self-driving vehicle 10b, the XR device 10c, the smartphone 10d, or the home appliance 10e through the cloud network 2, and may assist at least part of AI processing of the connected AI devices 10a to 10e.

At this time, the AI server 20 may learn the artificial neural network according to the machine learning algorithm instead of the AI devices 10a to 10e, and may directly store the learning model or transmit the learning model to the AI devices 10a to 10e.

At this time, the AI server 20 may receive input data from the AI devices 10a to 10e, may infer the result value for the received input data by using the learning model, may generate a response or a control command based on the inferred result value, and may transmit the response or the control command to the AI devices 10a to 10e.

Alternatively, the AI devices 10a to 10e may infer the result value for the input data by directly using the learning model, and may generate the response or the control command based on the inference result.

Hereinafter, various embodiments of the AI devices 10a to 10e to which the above-described technology is applied will be described. The AI devices 10a to 10e illustrated in FIG. 3 may be regarded as a specific embodiment of the AI device 10 illustrated in FIG. 1.

<AI+Robot>

The robot 10a, to which the AI technology is applied, may be implemented as a guide robot, a carrying robot, a cleaning robot, a wearable robot, an entertainment robot, a pet robot, an unmanned flying robot, or the like.

The robot 10a may include a robot control module for controlling the operation, and the robot control module may refer to a software module or a chip implementing the software module by hardware.

The robot 10a may acquire state information about the robot 10a by using sensor information acquired from various kinds of sensors, may detect (recognize) surrounding environment and objects, may generate map data, may determine the route and the travel plan, may determine the response to user interaction, or may determine the operation.

The robot 10a may use the sensor information acquired from at least one sensor among the lidar, the radar, and the camera so as to determine the travel route and the travel plan.

The robot 10a may perform the above-described operations by using the learning model composed of at least one artificial neural network. For example, the robot 10a may recognize the surrounding environment and the objects by using the learning model, and may determine the operation by using the recognized surrounding information or object information. The learning model may be learned directly from the robot 10a or may be learned from an external device such as the AI server 20.

At this time, the robot 10a may perform the operation by generating the result by directly using the learning model, but the sensor information may be transmitted to the external device such as the AI server 20 and the generated result may be received to perform the operation.

The robot 10a may use at least one of the map data, the object information detected from the sensor information, or the object information acquired from the external apparatus to determine the travel route and the travel plan, and may control the driving unit such that the robot 10a travels along the determined travel route and travel plan.

The map data may include object identification information about various objects arranged in the space in which the robot 10a moves. For example, the map data may include object identification information about fixed objects such as walls and doors and movable objects such as pollen and desks. The object identification information may include a name, a type, a distance, and a position.

In addition, the robot 10a may perform the operation or travel by controlling the driving unit based on the control/interaction of the user. At this time, the robot 10a may acquire the intention information of the interaction due to the user's operation or speech utterance, and may determine the response based on the acquired intention information, and may perform the operation.

<AI+Robot+Self-Driving>

The robot 10a, to which the AI technology and the self-driving technology are applied, may be implemented as a guide robot, a carrying robot, a cleaning robot, a wearable robot, an entertainment robot, a pet robot, an unmanned flying robot, or the like.

The robot 10a, to which the AI technology and the self-driving technology are applied, may refer to the robot itself having the self-driving function or the robot 10a interacting with the self-driving vehicle 10b.

The robot 10a having the self-driving function may collectively refer to a device that moves for itself along the given movement line without the user's control or moves for itself by determining the movement line by itself.

The robot 10a and the self-driving vehicle 10b having the self-driving function may use a common sensing method so as to determine at least one of the travel route or the travel plan. For example, the robot 10a and the self-driving vehicle 10b having the self-driving function may determine at least one of the travel route or the travel plan by using the information sensed through the lidar, the radar, and the camera.

The robot 10a that interacts with the self-driving vehicle 10b exists separately from the self-driving vehicle 10b and may perform operations interworking with the self-driving function of the self-driving vehicle 10b or interworking with the user who rides on the self-driving vehicle 10b.

At this time, the robot 10a interacting with the self-driving vehicle 10b may control or assist the self-driving function of the self-driving vehicle 10b by acquiring sensor information on behalf of the self-driving vehicle 10b and providing the sensor information to the self-driving vehicle 10b, or by acquiring sensor information, generating environment information or object information, and providing the information to the self-driving vehicle 10b.

Alternatively, the robot 10a interacting with the self-driving vehicle 10b may monitor the user boarding the self-driving vehicle 10b, or may control the function of the self-driving vehicle 10b through the interaction with the user. For example, when it is determined that the driver is in a drowsy state, the robot 10a may activate the self-driving function of the self-driving vehicle 10b or assist the control of the driving unit of the self-driving vehicle 10b. The function of the self-driving vehicle 10b controlled by the robot 10a may include not only the self-driving function but also the function provided by the navigation system or the audio system provided in the self-driving vehicle 10b.

Alternatively, the robot 10a that interacts with the self-driving vehicle 10b may provide information or assist the function to the self-driving vehicle 10b outside the self-driving vehicle 10b. For example, the robot 10a may provide traffic information including signal information and the like, such as a smart signal, to the self-driving vehicle 10b, and automatically connect an electric charger to a charging port by interacting with the self-driving vehicle 10b like an automatic electric charger of an electric vehicle.

Figure 4:
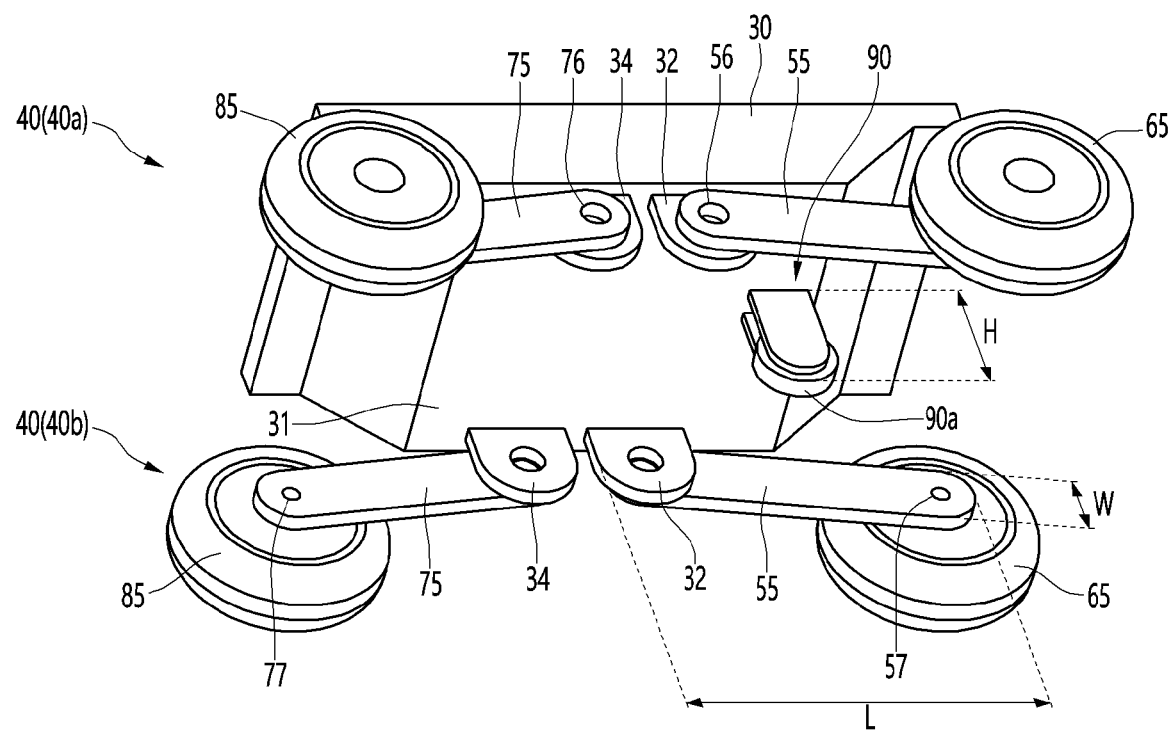
FIG. 4 is a diagram showing a driving unit of a robot of an embodiment.
Figure 5:
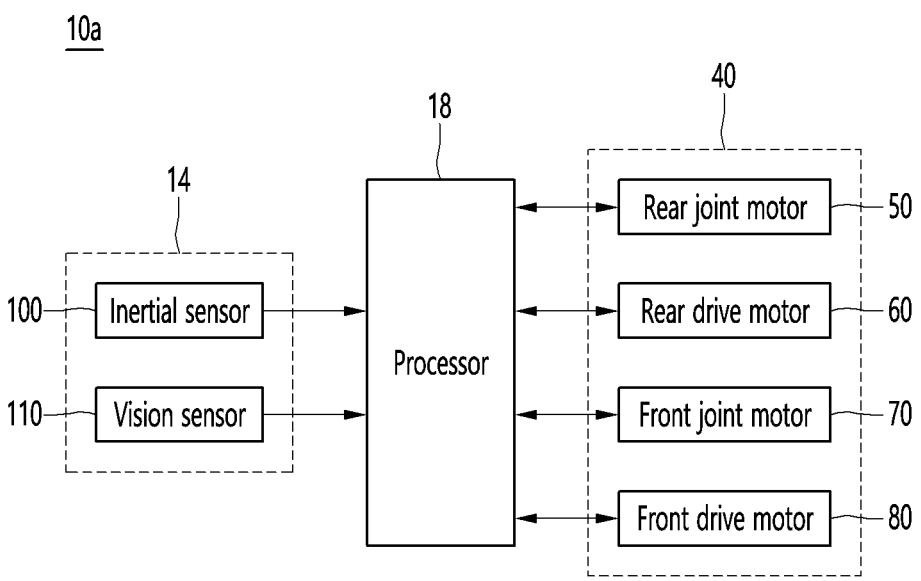
FIG. 5 is a control block diagram of a robot according to an embodiment.
Figure 6:
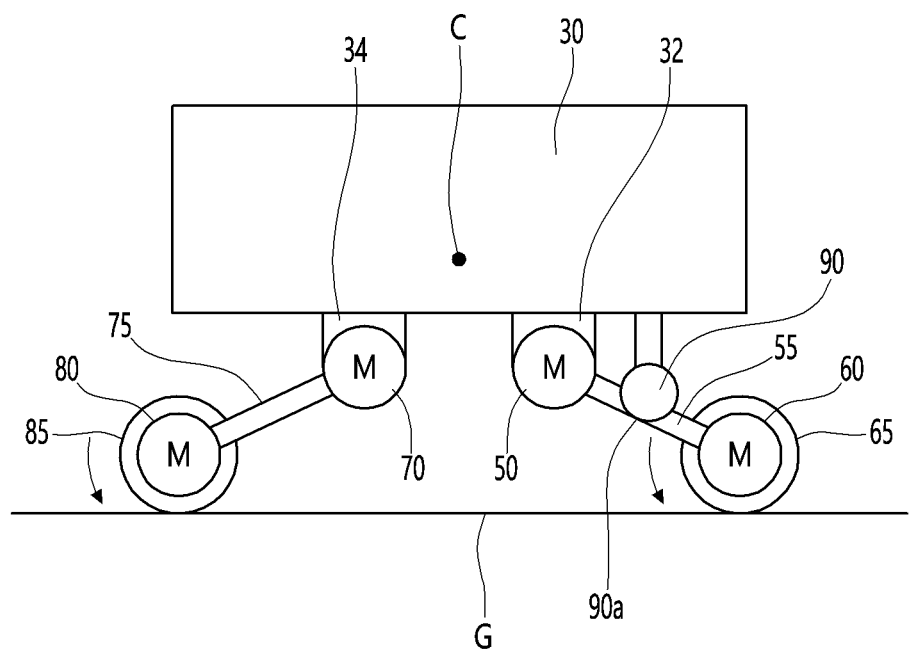
FIG. 6 is a side view in a case in which the robot according to the present embodiment travels on a flat surface.

FIG. 4 is a diagram showing a driving unit of a robot according to an embodiment, and FIG. 5 is a control block diagram of a robot according to an embodiment.

A robot 10a may include a body 30 and a driving unit 40 mounted on the body 30.

Examples of the robot 10a may include a delivery robot capable of transporting various articles such as food or a guide robot capable of providing various information to people around the robot 10a and guiding a person to a specific place.

When the robot 10a is a delivery robot, a carrier (or bracket) on which an article is placed may be disposed on the body 30.

The body 30 may be composed of an assembly of a plurality of members, and may be a robot body. The body 30 may include a base 31 that forms a bottom surface of the body 30.

The driving unit 40 may be disposed on the base 31.

A plurality of driving units 40 may be provided on the body 30. The plurality of driving units may include, for example, a left driving unit 40a and a right driving unit 40b. The left driving unit 40a and the right driving unit 40b may be symmetrically disposed.

Hereinafter, a common configuration of the left driving unit 40a and the right driving unit 40b will be referred to as the driving unit 40, which is described below.

The driving unit 40 may include a rear module and a front module.

The rear module may include a rear joint motor 50, a rear joint 55, a rear drive motor 60, and a rear wheel 65.

The front module includes a front joint motor 70, a front joint 75, a front drive motor 80, and a front wheel 85.

The rear module and the front module may be disposed symmetrically in a front-rear direction. The rear joint motor 50 may be disposed in a lower portion of the body 30. A rear bracket 32 may be disposed to protrude from a lower portion of the body 30, and the rear joint motor 50 may be mounted to the rear bracket 32.

The rear joint motor 50 may be connected to the rear joint 55, and may rotate the rear joint 55. The rotation shaft of the rear joint motor 50 may be connected to one side of the rear joint 65.

The rear joint 55 may be formed in a bar shape or a rod shape. The rear joint 55 may be rotated clockwise or counterclockwise direction by the rear joint motor 50.

The rear joint 55 may extend rearward from the rear joint motor 50, and may extend rearward and downward from the rear joint motor 50 obliquely, and may extend downward from the rear joint motor 50.

When the rear joint motor 50 rotates the rear joint 55 clockwise, the rear joint 55 may be erected close to be vertical, and when the rear joint motor 50 rotates the rear joint 55 counterclockwise, the rear joint 55 may be laid down close to be horizontal.

The rear joint motor 50 may be a height adjustment motor for adjusting the height of the body 30. The rear joint motor 50 may be a distance adjusting motor that adjusts a distance between the rear wheel 65 and the front wheel 85. When the rear joint motor 50 erects the rear joint 55, the distance between the rear wheel 65 and the front wheel 85 may be shortened, and the height of the body 30 may be raised. When the rear joint motor 50 lays the rear joint 55, the distance between the rear wheel 65 and the front wheel 85 may be lengthened, and the height of the body 30 may be lowered.

A connection portion to which the rear joint 55 is connected to the rear joint motor 50 may be an upper connection portion 56 or a front connection portion, and a connection portion to which the rear drive motor 60 is connected may be a lower connection portion 57 or a rear connection portion.

A rotation shaft of the rear joint motor 50 may be connected to the upper connection portion 56, and the rear drive motor 50 may be mounted to the lower connection portion 57.

The rear drive motor 60 may be disposed in the rear joint 55, and may be disposed in a lower portion of the rear joint 55.

The rear wheel 65 may be connected to a rotation shaft of the rear drive motor 60, and may be rotated by the rear drive motor 60.

The front joint motor 70 may be disposed in the lower portion of the body 30. The front joint motor 70 may be disposed in the lower portion of the body 2 to be spaced apart from the rear joint motor 50. A front bracket 34 may be disposed to protrude from the lower portion of the body 30, and the front joint motor 70 may be mounted to the front bracket 34. The front bracket 34 may be spaced apart from the rear bracket 32 in the front-rear direction.

The front joint motor 70 may be connected to the front joint 75, and may rotate the front joint 75. A rotation shaft of the front joint motor 70 may be connected to one side of the front joint 75.

The front joint 75 may be formed in a bar shape or a rod shape. The front joint 75 may be rotated in a clockwise or counterclockwise direction by the front joint motor 70.

The front joint 75 may extend forward from the front joint motor 70, and may obliquely extend forward and downward from the front joint motor 70.

When the front joint motor 70 rotates the front joint 75 clockwise, the front joint 75 may be laid down close to be horizontal, and when the front joint motor 70 rotates the front joint 75 counterclockwise, the front joint 75 may be erected close to be vertical.

The front joint motor 70 may be a height adjustment motor for adjusting the height of the body 30. The front joint motor 70 may be a distance adjusting motor that adjusts a distance between the rear wheel 65 and the front wheel 85. When the front joint motor 70 erects the front joint 75, the distance between the rear wheel 65 and the front wheel 85 may be shortened, and the height of the body 30 may be increased. When the front joint motor 70 lays the front joint 75, the distance between the rear wheel 65 and the front wheel 85 may be lengthened, and the height of the body 30 may be lowered.

A connection portion to which the front joint 75 is connected to the front joint motor 70 may be an upper connection portion 76 or a rear connection portion, and a connection portion to which the front drive motor 80 is connected may be a lower connection portion 77 or a rear connection portion.

A rotation shaft of the front joint motor 70 may be connected to the upper connection portion 76, and the front drive motor 80 may be mounted to the lower connection portion 77.

The front drive motor 80 may be disposed in the front joint 75, and may be disposed in the lower portion of the front joint 75.

The front wheel 85 may be connected to a rotation shaft of the front drive motor 60, and may be rotated by the front drive motor 80.

An encoder may be disposed in each of the rear joint motor 50, the rear drive motor 55, the front joint motor 70 and the front drive motor 80. The encoder may be a sensor capable of detecting a rotational speed and a rotational direction of a corresponding motor. The encoder may detect a rotational speed of a rotor when the motor is driven and transmit the rotational speed to the processor 18.

The robot may include a supporter 90.

The supporter 90 may be disposed in the lower portion of the body 30 to be spaced apart from the rear joint 55 and the front joint 75.

A length H of the supporter 90 may be shorter than a length L of the rear joint 55 and a length of the front joint 75. The length H of the supporter 90 may be longer than the width W of the rear joint 55 and the width of the front joint 75.

The length H of the supporter 90 may be defined as a length in the vertical direction of the supporter 90.

The length H of the supporter 90 may be longer than the vertical length of the rear bracket 32 and the vertical length of the front bracket 34.

The supporter 90 may be closer to the rear drive motor 60 than the front drive motor 80. The supporter 90 may be closer to the rear bracket 32 than the front bracket 34.

The supporter 90 may be a rear supporter that is closer to the rear end of the body 30 than the front end of the body 30 in the front-rear direction (X).

The supporter 90 may be disposed to protrude downward from the bottom surface of the body 30. The supporter 90 may be disposed between the rear module and the front module. The supporter 90 may be disposed to protrude downward from the bottom surface of the body 30.

When each of the rear joint 55 of the left module and the rear joint 55 of the right module are rotated horizontally around the rear bracket 32, the supporter 90 may be positioned between the rear joint 55 of the left module and the rear joint 55 of the right module.

When the rear joint 55 is rotated horizontally, a lower end 90a of the supporter 90 may be positioned lower than a lower end of the rear joint 55, and may be positioned lower than a lower end of the rear wheel 65.

An example of the supporter 90 may be a caster rotatably disposed on the bottom surface of the body 30. The supporter 90 may act as an auxiliary wheel or roller to help the robot 10a travel at a position spaced apart from the rear wheel 65 and the front wheel 85.

The robot 10a may further include an inertial sensor 100 and a vision sensor 110 installed on the body 30.

The inertial sensor 100 is a device capable of measuring a speed, direction, and gravitational acceleration of the robot, and may be, for example, an IMU (Inertial Measurement Unit). The inertial sensor 100 may recognize the movement of the robot 10a using an accelerometer, an angular accelerometer, a geomagnetic machine and/or an altimeter. An example of the inertial sensor 100 may be T265.

The vision sensor 110 is a device capable of photographing an image, and may be a camera sensor or an image sensor. The vision sensor 110 may photograph an image around the robot 10a.

The processor 18 may independently control each of the rear joint motor 50, the rear drive motor 60, the front joint motor 70, and the front drive motor 80.

Each of the rear joint motor 50, the rear drive motor 60, the front joint motor 70, and the front drive motor 80 may include a motor controller.

The robot 10a may further include a communication converter (e.g., MCP) capable of performing communication conversion between each motor controller and the processor 18. For example, the processor 18 may perform SPI communication with the communication converter, and the communication converter may CAN communication with the motor controller of each of the rear joint motor 50, the rear drive motor 60, the front joint motor 70 and the front drive motor 80.

Figure 11:
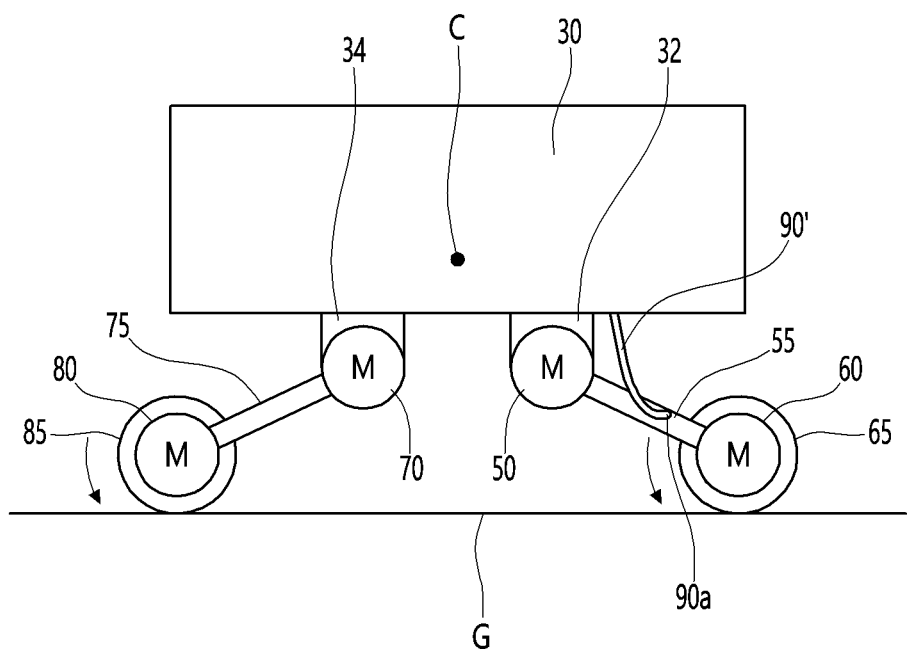
FIG. 11 is a side view when a modified example of the robot shown in FIG. 1 is traveling on a flat surface.
Figure 12:
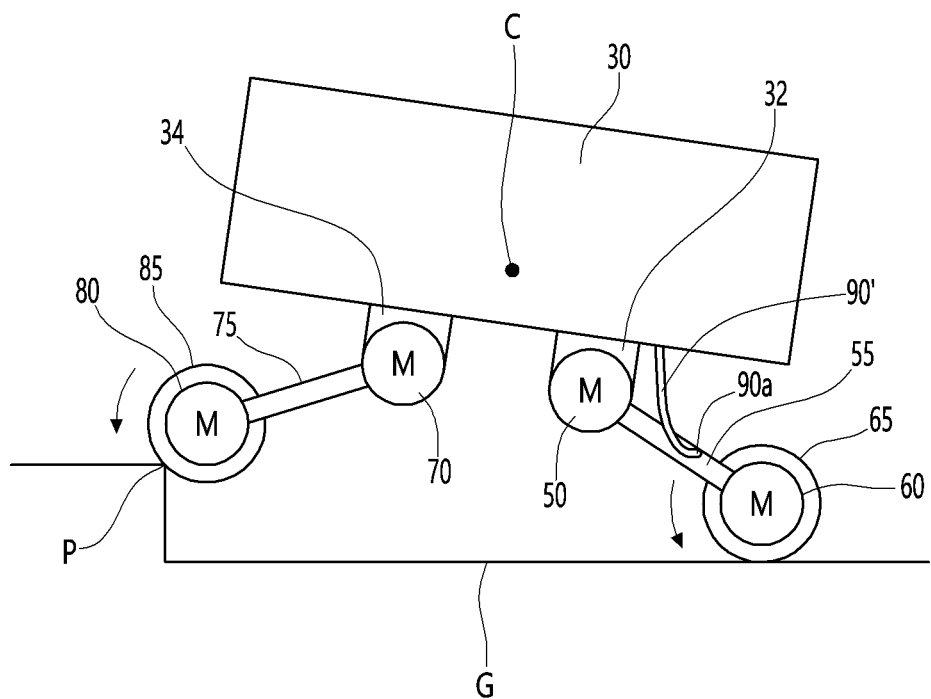
FIG. 12 is a side view when the front wheel of the robot shown in FIG. 11 climbs an obstacle.
Figure 13:
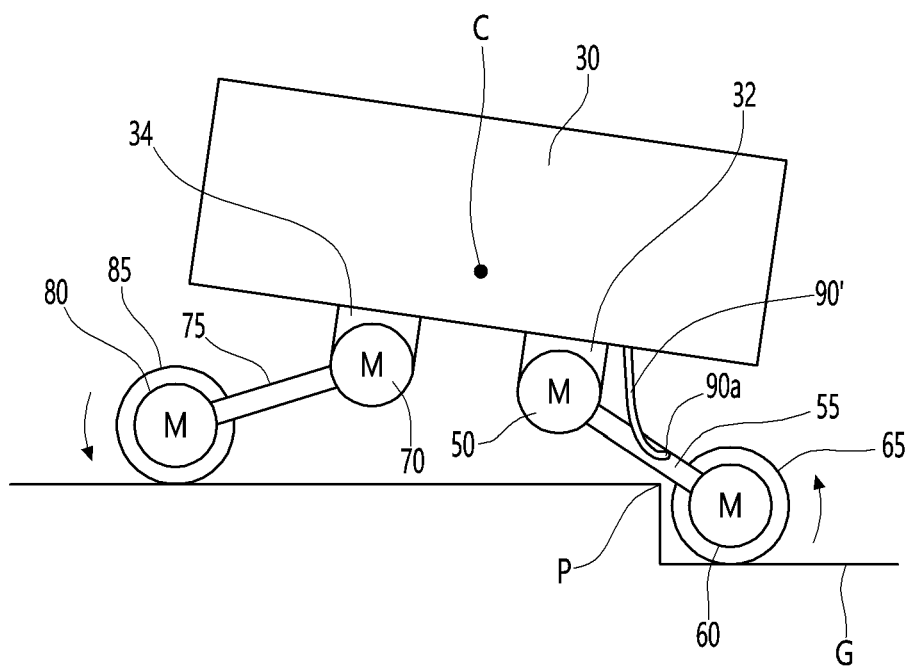
FIG. 13 is a side view when the rear wheel of the robot shown in FIG. 12 cannot climb an obstacle.
Figure 14:
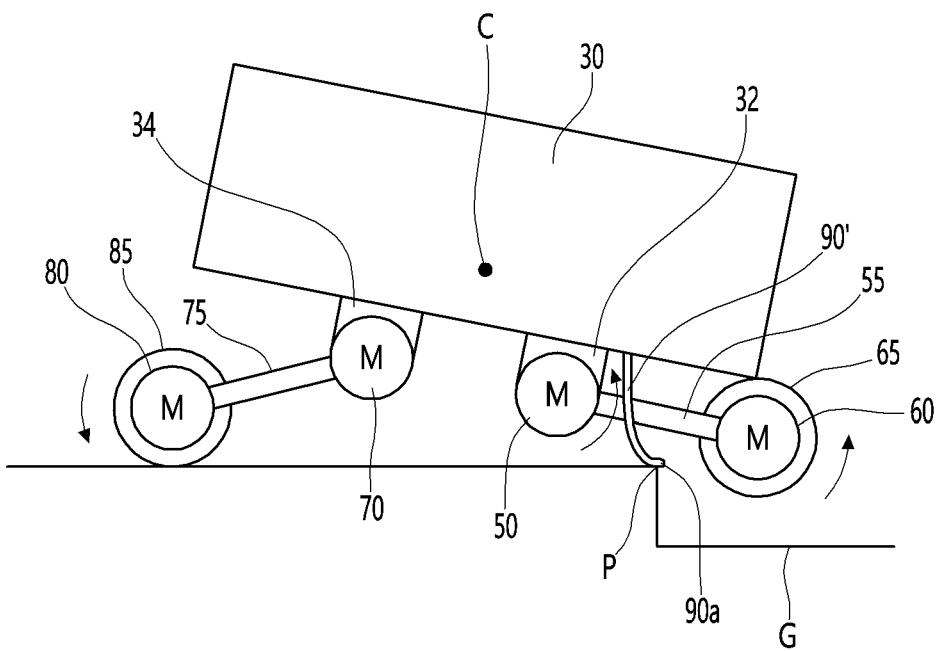
FIG. 14 is a side view when the robot shown in FIG. 13 is in a rear joint raising mode.
Figure 15:
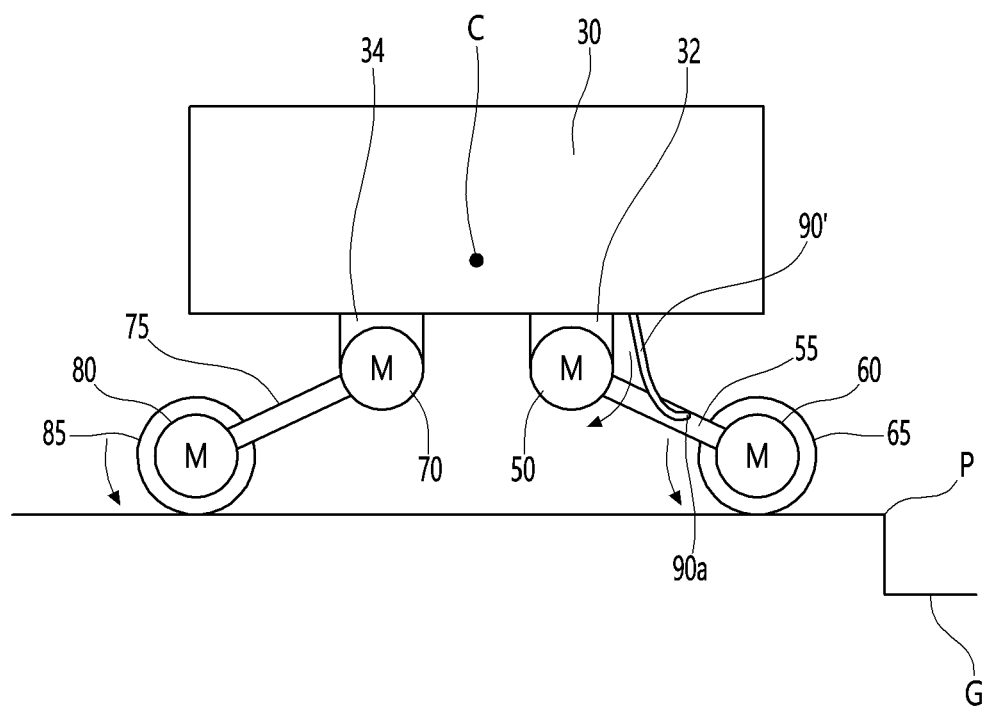
FIG. 15 is a side view when the robot shown in FIG. 14 is in a rear joint lowering mode.

FIG. 11 is a side view when a modified example of the robot shown in FIG. 1 is traveling on a flat surface, FIG. 12 is a side view when the front wheel of the robot shown in FIG. 11 climbs an obstacle, FIG. 13 is a side view when the rear wheel of the robot shown in FIG. 12 cannot climb an obstacle, FIG. 14 is a side view when the robot shown in FIG. 13 is in a rear joint raising mode, and FIG. 15 is a side view when the robot shown in FIG. 14 is in a rear joint lowering mode.

The processor 18 may implement a driving mode, a rear joint raising mode, and a rear joint lowering mode (RD).

The driving mode may be a mode in which the rear drive motor 60 and the front drive motor 80 are driven together.

In the driving mode, the rear drive motor 60 and the front drive motor 80 may be driven together, the rear wheel 65, the front wheel 85 may be rotated together, and the robot 10*a* may travel forward.

The driving mode may be a mode typically implemented when the robot 10*a* is traveling.

In the driving mode, the robot 10*a* may prevent a lower end 90*a* of the supporter 90 from coming into contact with the ground G or a stumbling block P.

In the driving mode, the robot 10*a* may control the rear joint motor 50 and the front joint motor 70 such that the height of the rear wheel 65 and the height of the front wheel 85 are lower than the height of the supporter 90.

Figure 7:
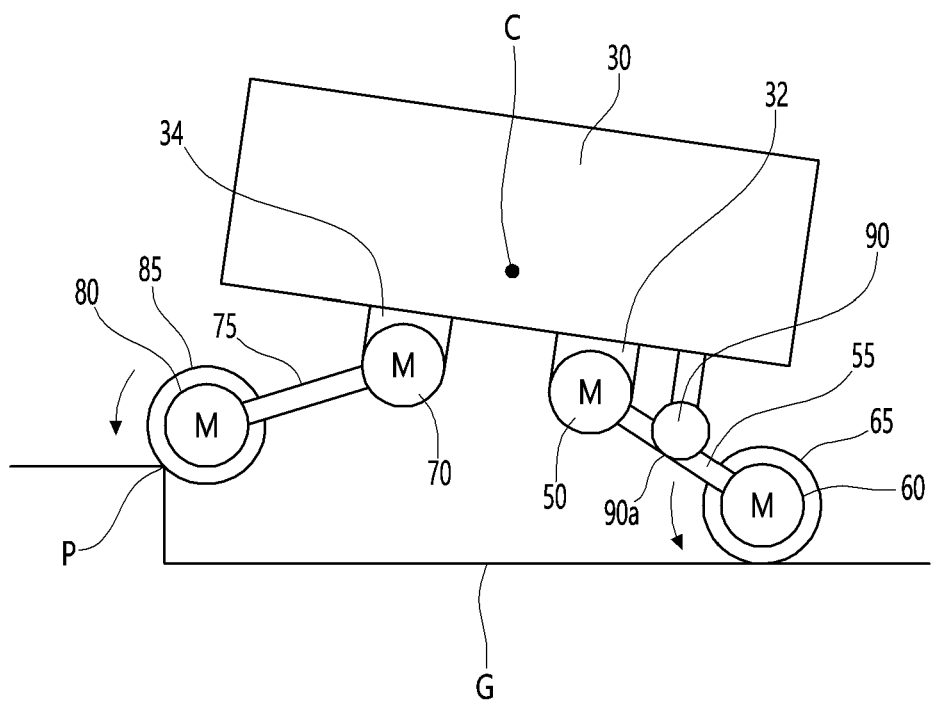
FIG. 7 is a side view in a case in which the front wheel of the robot shown in FIG. 6 climbs an obstacle.

As shown in FIG. 7, during the driving mode, the robot 10*a* may meet a terrain with a step (hereinafter referred to as a stumbling block), and the front wheel 85 may climb on a stumbling block P and the height of the front part of the robot 10*a* may be temporarily higher than the height of the rear part of the robot 10*a*.

Figure 8:
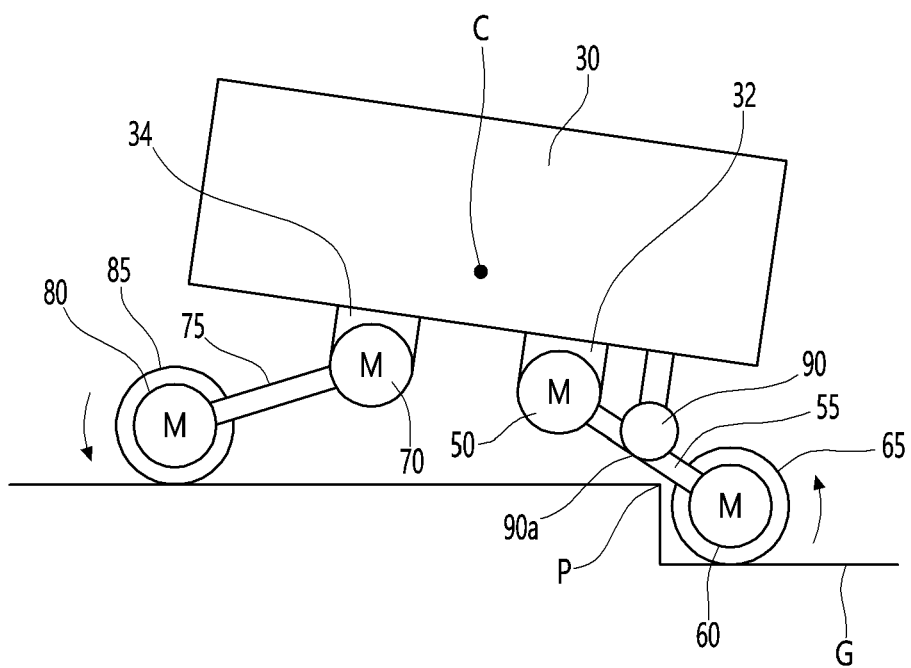
FIG. 8 is a side view in a case in which the rear wheel of the robot shown in FIG. 7 cannot climb an obstacle.

As shown in FIG. 7, after the front wheel 85 of the robot 10*a* is mounted on the stumbling block P, the rear wheel 65 of the robot 10*a* may be caught in stumbling block P as shown in FIG. 8, and the rear wheel 65 may not be able to climb on the stumbling block P.

When the height of the stumbling block P is greater than the radius of the rear wheel 65, the rear wheel 65 may not ride over the stumbling block P and may be caught on the wall of the stumbling block P.

As described above, when the rear wheel 65 is caught on the stumbling block P, the robot 10*a* cannot move forward, the front wheel 85 and the rear wheel 65 may idle, and when the robot 10*a* cannot climb on the stumbling block, the robot 10*a* may start the rear joint rising mode, which is a special mode when the robot 10*a* cannot climb the stumbling block P.

The rear joint raising mode is a special mode that is distinct from the driving mode, which is a general mode, and may be started in the middle of the driving mode.

The rear joint raising mode may be implemented when the moved distance of the body 50 is within a set distance (a first set distance) or the body 30 is in a stationary state while the front drive motor 90 is being driven.

Figure 9:
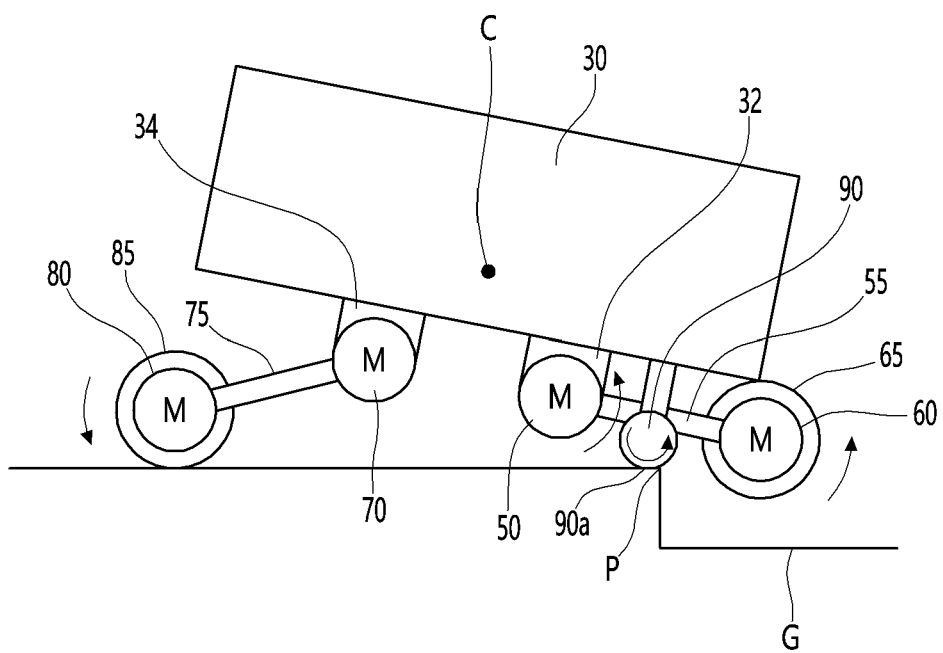
FIG. 9 is a side view in a case where the robot shown in FIG. 8 is in a rear joint raising mode.

The rear joint raising mode may be a mode in which the rear joint motor 50 raises the rear joint 55 as shown in FIG. 9 such that the supporter 90 is in contact with the upper surface of the stumbling block P.

The supporter 90 may not contact the ground G or the stumbling block P in the driving mode and may come into contact with the upper surface of the stumbling block P when the robot 10*a* operates in the rear joint raising mode.

The processor 18 may start the rear joint raising mode according to the sensing results of the encoder, the inertial sensor 100 and the vision sensor 110.

The processor 18 may identify that the front drive motor 80 is currently driving the front wheel 85, through a signal from the encoder, and identify that the robot 100*a* cannot move as much as the set distance, through the inertial sensor 100 and the vision sensor 110.

When the rear joint raising mode is started, the rear joint motor 50 may rotate the rear joint 55 in the counterclockwise direction by a set angle (e.g., 25°). As the rear joint 55 is rotated, the rear wheel 65 may be separated from the ground G, and the lower end 90*a* of the supporter 90 may be in contact with the upper surface of the stumbling block P.

When the lower end of the rear wheel 65 is higher than the lower end 90*a* of the supporter 90, the rear wheel 65 may not interfere with the stumbling block P, and the set angle may be preferably to an angle such that the lower end of the rear wheel 65 is higher than the lower end 90*a* of the supporter 90 when the rear joint 65 is rotated in the counterclockwise direction.

When the lower end 90*a* of the supporter 90 is in contact with the upper surface of the stumbling block P, and the rear wheel 65 is spaced apart from the ground P, the center of gravity C of the robot 10*a* may be lower than that in a case in which the rear wheel 65 is caught on the stumbling block P, and the robot 100 may secure a new support point due to the supporter 90.

The robot 10*a* may travel in a forward direction according to the rotation of the front wheel 85, and the supporter 90 may help the robot 10*a* travel while supporting the rear portion of the robot 10*a*.

The robot 10*a* may be advanced on the stumbling block P, and the processor 18 may end the rear joint raising mode in the middle of the rear joint raising mode, and may implement the rear joint lowering mode.

The processor 13 may drive the front drive motor 80 in the middle of the rear joint raising mode, and when the body 30 has been moved the set distance D or the set time has elapsed after the rear joint rising mode is started, the processor may control the rear joint motor 50 in the rear joint lowering mode such that the supporter 90 may be spaced apart from the stumbling block P.

The rear joint lowering mode is a special mode distinct from the driving mode, which is a general mode, and may be performed subsequently to the rear joint raising mode.

Figure 10:
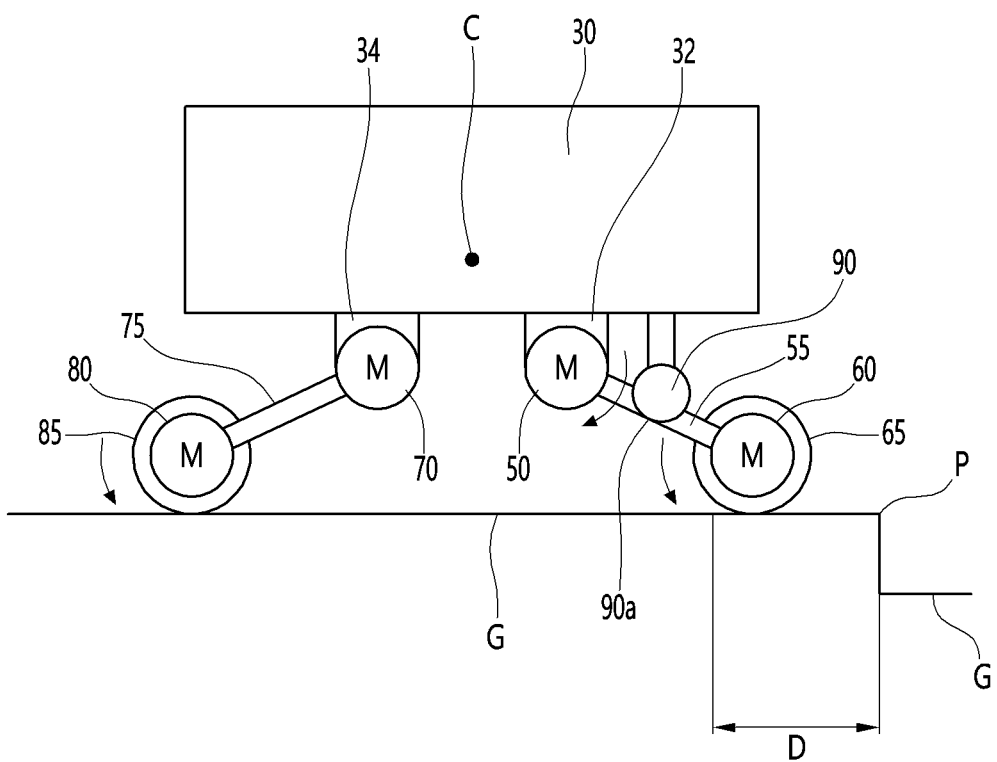
FIG. 10 is a side view in a case where the robot shown in FIG. 9 is in a rear joint lowering mode.

In the rear joint lowering mode, the rear joint motor 50 may rotate the rear joint 55 in a clockwise direction by a set angle (e.g., 25°) as shown in FIG. 10. As the rear joint 55 is reversely rotated, the rear wheel 65 may come into contact with the upper surface of the stumbling block P, and the lower end 90*a* of the supporter 90 may be spaced apart from the upper surface of the stumbling block P.

When the rear joint lowering mode is completed, the driving mode of the robot may be restarted, and the front wheel 85 and the rear wheel 55 may be driven along the upper surface of the stumbling block P.

A method for controlling the robot according to this embodiment may control a robot 10*a*, the robot 10*a* including a rear joint motor 50 and a front joint motor 70 installed to be spaced apart from each other in a lower portion of a body 30, a rear joint 55 configured to be rotated by the rear joint motor 50, a rear drive motor 60 disposed in a lower portion of the rear joint 55, a rear wheel 65 configured to be rotated by the rear drive motor 65, a front joint 75 configured to be rotated by the front joint motor 70, a front drive motor 80 disposed in a lower portion of the front joint 75, a front wheel 85 configured to be rotated by the front drive motor 80, and a supporter 90 disposed in the lower portion of the body 30 to be spaced apart from the rear joint 55 and the front joint 75.

The method for controlling the robot 10*a* may include driving the front drive motor 80 and the rear drive motor 60, and performing a rear joint raising mode when the body 30 is stopped during driving of the front drive motor 80.

In the rear joint raising mode, the processor 18 may control the rear joint motor 50. The processor 18 may control the rear joint motor 50 such that the rear joint motor 50 rotates the rear joint 55 in the counterclockwise direction as shown in FIG. 9.

The method for controlling the robot may further include performing a rear joint lowering mode after the rear joint raising mode.

When the front drive motor 80 is driven and the body 90 is moved a set distance (a second set distance) D, the rear joint lowering mode may be started, and the processor 18 may control the rear joint motor 50. The processor 18 may control the rear joint motor 50 such that the rear joint motor 50 rotates the rear joint 55 in the clockwise direction as shown in FIG. 10.

The second set distance may be equal to the first set distance.

The second set distance may be shorter than the first set distance.

FIG. 11 is a side view when a modified example of the robot shown in FIG. 1 is traveling on a flat surface, FIG. 12 is a side view when the front wheel of the robot shown in FIG. 11 climbs an obstacle, FIG. 13 is a side view when the rear wheel of the robot shown in FIG. 12 cannot climb an obstacle, FIG. 14 is a side view when the robot shown in FIG. 13 is in a rear joint raising mode, and FIG. 15 is a side view when the robot shown in FIG. 14 is in a rear joint lowering mode.

The robot shown in FIGS. 11 to 15 may include a supporter 90', and the supporter 90' may include an elastic member disposed on the bottom surface of the body 30.

An example of the supporter 90' may be a leaf spring that is convex toward the ground.

When an external force does not act on the supporter 90', the length H of the supporter 90' may be shorter than the length L of the rear joint 55 and the length of the front joint 75. The length H of the supporter 90' may be longer than the width W of the rear joint 55 and the width of the front joint 75. The length H of the supporter 90' may be defined as the vertical length of the supporter 90'. The length H of the supporter 90' may be longer than the vertical length of the rear bracket 32 and the vertical length of the front bracket 34.

As shown in FIGS. 11 to 15, the robot 10a may ride over the stumbling block P while traveling on the ground G.

As shown in FIG. 14, the rear wheel 65 of the robot 10a is rotated counterclockwise so that the rear wheel 65 may be spaced apart from the ground G, and the lower end 90a of the supporter 90' may be in contact with the upper surface of the stumbling block P.

The supporter 90' is made of an elastic member and may absorb shock occurring when the supporter 90' comes into contact with the upper surface of the stumbling block P.

As shown in FIG. 15, the rear wheel 65 of the robot 10a is rotated counterclockwise so that the rear wheel 65 may come into contact with the upper surface of the stumbling block P and the lower end 90a of the supporter 90' may be spaced apart from the upper surface of the stumbling block P.

In a modified example of the robot, the configuration of the modified robot may be the same as that of the robot 10a of FIGS. 1 to 10 except that the supporter 90' is made of an elastic member, and detailed description thereof will be omitted to avoid redundant description.

Figure 16:
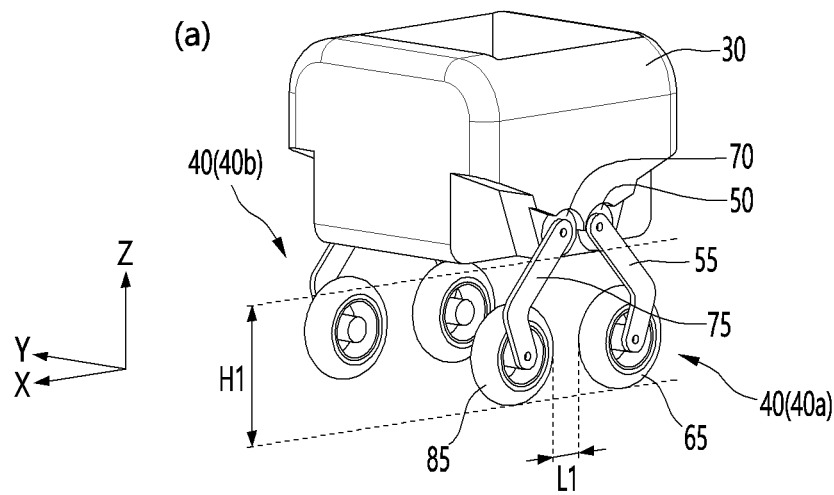
FIG. 16 is an example showing various modes of the robot according to the present embodiment.
Figure 16:
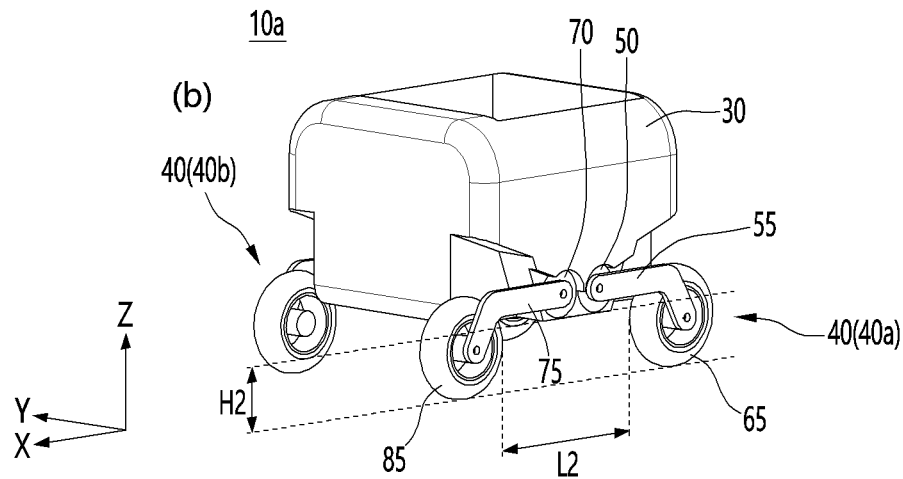
Figure 16:
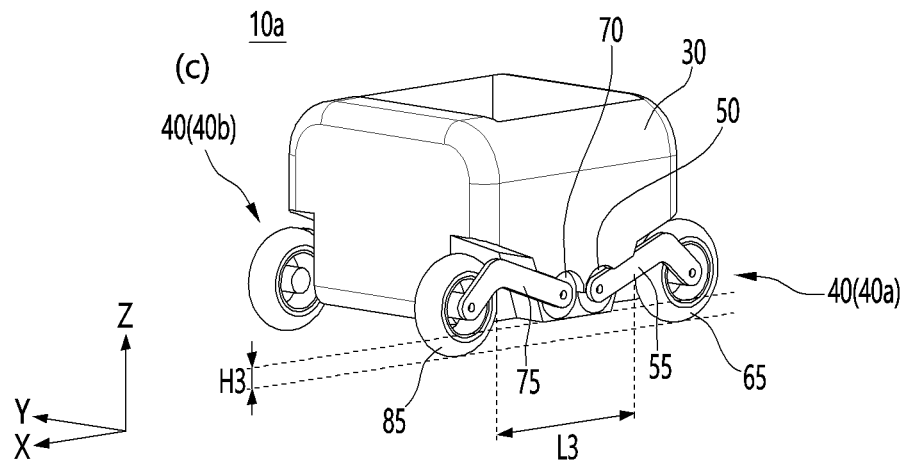

FIG. 16 is an example showing various modes of the robot according to the present embodiment.

In FIG. 16, (a) is a diagram in a case where the robot is in an indoor driving mode, (b) is a diagram in a case where the robot is in a terrain overcoming driving mode, and (c) is a diagram in a case in which the robot is in an outdoor flat driving mode.

The rear joint motor 50 and the front joint motor 70 may be motors having a high RPM and a high torque, and may operate like a damper or spring, particularly a torsion spring, without a spring, and may lower a reduction ratio (9 to 6:1) and realize a high RPM to minimize a reaction time.

The rear joint motor 50 and the front joint motor 70 may operate to cancel a torque acting on the rear drive motor 60 or the front drive motor 80 when the robot rides over a step such as an obstacle or a stumbling block P (see FIGS. 8 and 9).

The rear joint motor 50 and the front joint motor 70 may have a high weight of angle control (position control) and a low weight of torque control in normal times, such as traveling on flat ground.

When the external torque changes rapidly, the rear joint motor 50 and the front joint motor 70 may have a high the weight of the torque control. Therefore, when the rear wheel 65 or the front wheel 85 suddenly falls, it is possible to respond this situation immediately (in real time).

The rear joint motor 50 and the front joint motor 70 may perform the torque control only using a single encoder.

The processor 18 may detect the inclination of the robot 10a through an acceleration sensor installed in the robot 10a, and in this case, may perform control for the entire body. When controlling the entire body, the robot 10a may be kept horizontal as a whole, and when passing through obstacles or pits, the rear joint motor 50 and the front joint motor 70 may function as a damper or a spring.

The rear joint motor 50 and the front joint motor 70 may adjust a height of the body 30 in various modes.

When the robot 10a travels indoors, as shown in (a) of FIG. 16, the robot 10a may perform an indoor driving mode, and in the indoor driving mode, the processor 18 may rotate the rear joint 55 and the front joint 75 such that the rear wheel 65 and the front wheel 85 are spaced apart from each other by a first distance L1 in the front-rear direction X, and the height of the lower surface of the body 30 is positioned at the first height H1 from the ground.

The first distance L1 may be shorter than that of other modes, and the first height H1 may be higher than that of other modes.

In the indoor driving mode, the rear wheel 65 and the front wheel 85 of the robot 10a may minimize collision or interference with other objects nearby to enable the robot 10a to stably travel on a narrow road.

When the robot 10a travels on a terrain where obstacles exist, as shown in (b) of FIG. 16, the robot 10a may perform a terrain overcoming driving mode, and in the terrain overcoming driving mode, the processor 18 may rotate the rear joint 55 and the front joint 75 such that the rear wheel 65 and the front wheel 85 are spaced apart from each other by a second distance L2 in the front-rear direction X, and the height of the lower surface of the body 30 is positioned at a second height H2 from the ground.

The second distance L2 may be longer than the first distance L1, and the second height H2 may be lower than the first height H1.

When the robot 10a travels on a terrain where a flat ground exists, as shown in (c) of FIG. 16, the robot 10a may perform an outdoor flat driving mode, and in the outdoor flat driving mode, the processor 18 may rotate the rear joint 55 and the front joint 75 such that the rear wheel 65 and the front wheel 85 are spaced apart from each other by a third distance L3 in the front-rear direction X, and the height of the lower surface of the body 30 is positioned at a third height H3 from the ground.

The third distance L3 may be longer than that of other modes, and may be longer than first distance L1 and the second distance L2. The third height H3 may be lower than that of other modes, and may be lower than the first height H1 and the second height H2.

In the outdoor flat driving mode, the robot 10a may travel outdoors at high speed because the height of the body 30 is low and the center of gravity thereof is low.

Figure 17:
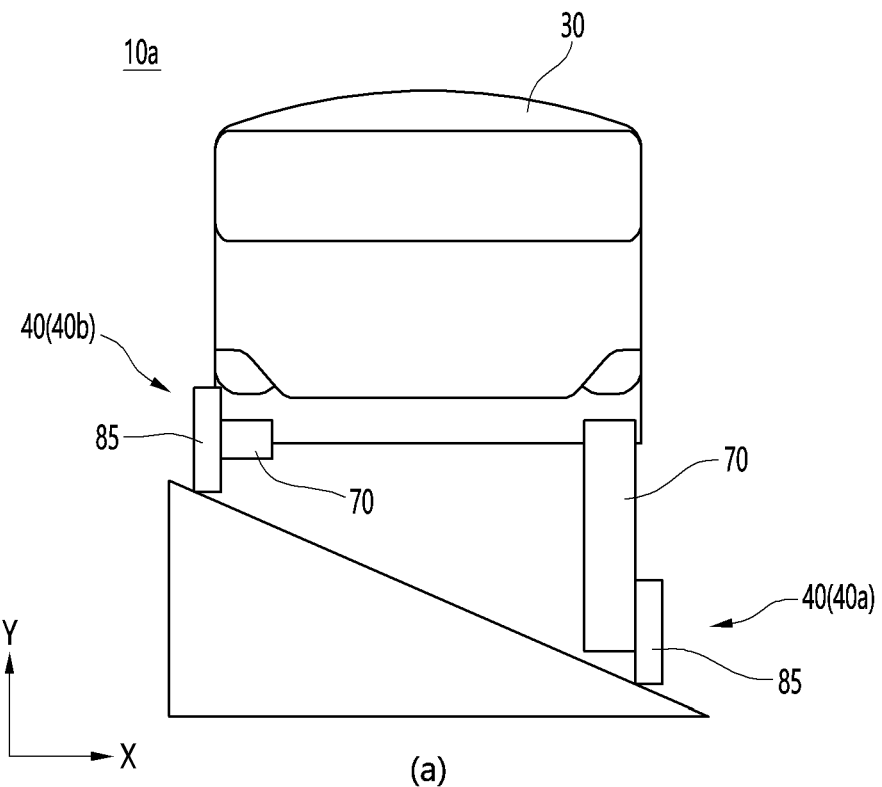
FIG. 17 is a diagram in a case where the robot according to the present embodiment is in an inclined mode.
Figure 17:
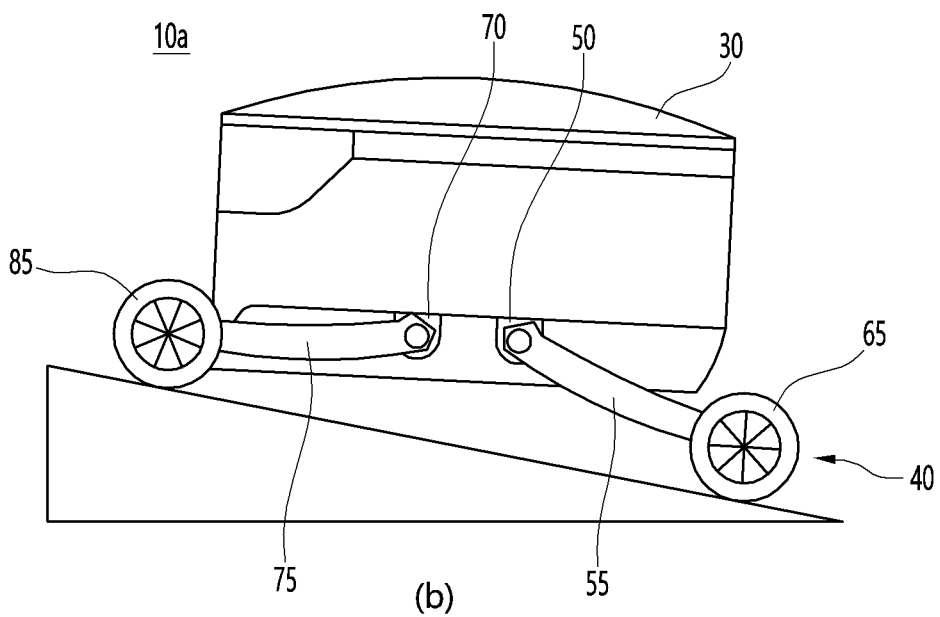

FIG. 17 is a diagram in a case where the robot according to the present embodiment is in an inclined mode.

In FIG. 17, (a) is a diagram in a case in which the robot is in a left-right inclination driving mode, and (b) is a diagram in a case where the robot is in a front-rear inclination driving mode.

As shown in (a) of FIG. 17, the robot 10a may pass through a terrain inclined or stepped in a left-right direction, and the robot 10a may be in a left-right inclination driving mode.

In the left-right inclination driving mode where the right side is high, the rear joint motor 50 and the front joint motor 70 of a right driving part 40b may rotate the rear joint 55 and the front joint 75 approximately horizontally or close to be horizontal. On the other hand, the rear joint motor 50 and the front joint motor 70 of a left drive part 40a may rotate the rear joint 55 and the front joint 75 to be inclined more than the right drive part 40b.

Conversely, in the left-right inclination driving mode where the left side is high, the rear joint motor 50 and the front joint motor 70 of the left driving part 40a may rotate the rear joint 55 and the front joint 75 approximately horizontally or close to be horizontal. On the other hand, the rear joint motor 50 and the front joint motor 70 of the right drive part 40b may rotate the rear joint 55 and the front joint 75 to be inclined more than the right drive part 40b.

In the left-right inclination driving mode as described above, the body 30 may be minimize to be inclined to the left or right, and the body 30 may be in a substantially horizontal state in the left-right direction Y.

As shown in (b) of FIG. 17, the robot 10a may pass through a terrain inclined or stepped in the front-rear direction, and the robot 10a may be in the front-rear inclination driving mode.

In the front-rear inclination driving mode, the front joint motor 70 and the rear joint motor 50 may rotate the front joint 75 and the rear joint 55 at different angles.

As shown in (b) of FIG. 17, when the robot 10a climbs an uphill terrain, the front joint motor 70 may rotate the front joint 75 approximately horizontally or close to be horizontal, and the rear joint motor 50 may rotate the rear joint 55 to be inclined more than the front joint 75.

Conversely, when the robot 10a passes through a downhill terrain, the rear joint motor 50 may rotate the rear joint 55 approximately horizontally or close to be horizontal, and the front joint motor 70 may rotate the front joint 75 to be inclined more than the rear joint 55.

In the front-rear inclination driving mode as described above, the body 30 may be minimize to be inclined to the front or rear, and the body 30 may be in a substantially horizontal state in the front-rear direction X.

Figure 18:
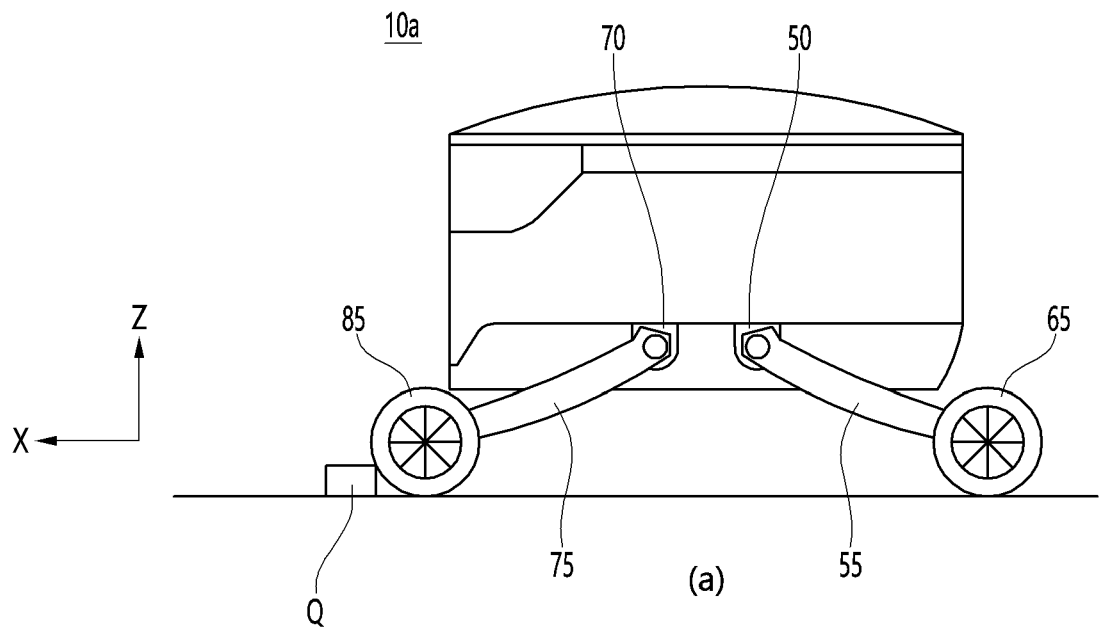
FIG. 18 is a view showing a state in which a body is in a horizontal state when the robot according to the present embodiment rides over an obstacle.
Figure 18:
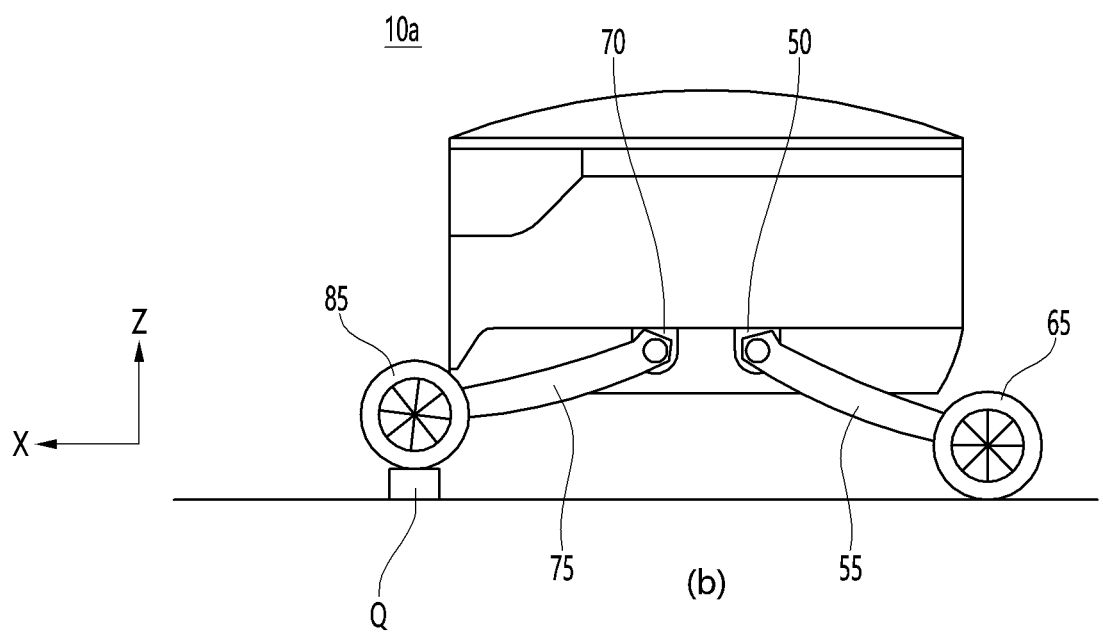

FIG. 18 is a view showing a state in which a body is in a horizontal state when the robot according to the present embodiment rides over a protrusion.

When the robot 10a travels forward on the ground, as shown in (a) of FIG. 18, the robot 10a may meet the protrusion Q protruding from the ground, and the front joint motor 70 and the rear joint motor 50 may rotate the front joint 75 and the rear joint 55 at different angles as shown in (b) of FIG. 18.

As shown in (b) of FIG. 18, the front joint motor 70 may rotate the front joint 75 closer to be horizontal than the rear joint 55, and the rear joint motor 50 may rotates the rear joint 55 closer to be vertical than the front joint 75.

In this case, inclination of the body 30 forward or backward may be minimized, and the body 30 may maintain an approximately horizontal state in the front-rear direction X.

According to the present embodiment, even when the robot meets a stepped terrain, the rear wheel may be separated from the ground and the load may be distributed by the supporter, so that the robot may easily climb on the stepped terrain and the driving ability of the robot this may be improved.

In addition, with the simple control of rotating the rear joint, the robot may easily pass through the stepped terrain without avoiding the stepped terrain.

In addition, the supporter may function as an auxiliary wheel to help the robot travel smoothly when the robot passes through the stepped terrain.

In addition, since the supporter is made of an elastic member, it is possible to minimize the impact that may occur when the robot climbs on the stepped terrain.

The above-disclosed subject matter is to be considered illustrative, and not restrictive, and the appended claims are intended to cover all such modifications, enhancements, and other implementations, which fall within the scope of the present disclosure.

Thus, the implementation of the present disclosure is to be considered illustrative, and not restrictive.

Therefore, the scope of the present disclosure is defined not by the detailed description of the invention but by the appended claims, and all differences within the scope will be construed as being included in the present disclosure.

What is claimed is:

1. A robot comprising:
   a rear joint motor and a front joint motor installed to be spaced apart from each other in a lower portion of a body;
   a rear joint configured to be rotated by the rear joint motor;
   a rear drive motor disposed in a lower portion of the rear joint;
   a rear wheel configured to be rotated by the rear drive motor;
   a front joint configured to be rotated by the front joint motor;
   a front drive motor disposed in a lower portion of the front joint;
   a front wheel configured to be rotated by the front drive motor;
   a supporter disposed in the lower portion of the body to be spaced apart from the rear joint and the front joint and having a length shorter than a length of the rear joint and a length of the front joint; and
   a processor configured to perform a rear joint raising mode when a moved distance of the body is within a set distance or the body is stationary during driving of the front drive motor,
   wherein the rear joint raising mode is a mode in which the rear joint motor raises the rear joint such that the rear wheel is spaced apart from a ground,
   wherein the supporter is closer to the rear drive motor than the front drive motor.

2. The robot of claim 1, wherein the supporter is disposed to protrude downward from a bottom surface of the body.

3. The robot of claim 1, wherein the supporter is disposed on a bottom surface of the body.

4. The robot of claim 1, wherein the processor is configured to drive the front drive motor after the rear joint rising mode, and when the body is moved a set distance, control the rear joint motor in a rear joint lowering mode.

5. A robot comprising:
- a rear joint motor and a front joint motor installed to be spaced apart from each other in a lower portion of a body;
- a rear joint configured to be rotated by the rear joint motor;
- a rear drive motor disposed in a lower portion of the rear joint;
- a rear wheel configured to be rotated by the rear drive motor;
- a front joint configured to be rotated by the front joint motor;
- a front drive motor disposed in a lower portion of the front joint;
- a front wheel configured to be rotated by the front drive motor;
- a supporter disposed in the lower portion of the body to be spaced apart from the rear joint and the front joint and having a length shorter than a length of the rear joint and a length of the front joint; and
- a processor configured to perform a rear joint raising mode when a moved distance of the body is within a set distance or the body is stationary during driving of the front drive motor,
- wherein the rear joint raising mode is a mode in which the rear joint motor raises the rear joint such that the rear wheel is spaced apart from a ground,
- wherein the supporter includes an elastic member disposed on a bottom surface of the body.

6. The robot of claim 5, wherein the supporter is convex toward the ground.

7. A robot comprising:
- a rear joint motor and a front joint motor installed to be spaced apart from each other in a lower portion of a body;
- a rear joint configured to be rotated by the rear joint motor;
- a rear drive motor disposed in a lower portion of the rear joint;
- a rear wheel configured to be rotated by the rear drive motor;
- a front joint configured to be rotated by the front joint motor;
- a front drive motor disposed in a lower portion of the front joint;
- a front wheel configured to be rotated by the front drive motor;
- a supporter disposed in the lower portion of the body to be spaced apart from the rear joint and the front joint and having a length shorter than a length of the rear joint and a length of the front joint; and
- a processor configured to perform a rear joint raising mode when a moved distance of the body is within a set distance or the body is stationary during driving of the front drive motor,
- wherein the rear joint raising mode is a mode in which the rear joint motor raises the rear joint such that the rear wheel is spaced apart from a ground,
- the robot further comprising:
- an encoder disposed in the front drive motor; and
- an inertial sensor and a vision sensor installed on the body,
- wherein the processor is configured to initiate the rear joint raising mode according to sensing results of the encoder, the inertial sensor, and the vision sensor.

* * * * *